United States Patent [19]

Grott

US005300123A

[11] Patent Number: 5,300,123
[45] Date of Patent: Apr. 5, 1994

[54] METHOD OF REFORMING SOLUBLE SALTS TO EFFECT PURIFICATION AND INCREASE CRYSTAL SIZE THEREOF

[76] Inventor: Gerald J. Grott, 665 Val Verde Cir., P.O. Box 262, Litchfield Park, Ariz. 85340

[21] Appl. No.: 416,823

[22] Filed: Oct. 3, 1989

Related U.S. Application Data

[63] Continuation of Ser. No. 309,316, Feb. 10, 1989, abandoned, which is a continuation of Ser. No. 106,174, Oct. 7, 1989, abandoned.

[51] Int. Cl.$^5$ ............................ C01D 3/16; C01D 3/06
[52] U.S. Cl. ................................. 23/303; 23/302 R; 23/302 T; 71/63
[58] Field of Search ............................ 423/421, 206 T; 23/302 T, 303, 302 R; 71/63

[56] References Cited

U.S. PATENT DOCUMENTS

| | | | |
|---|---|---|---|
| 1,899,310 | 2/1933 | Burnham | 23/303 |
| 2,927,010 | 3/1960 | Le Baron | 23/303 |
| 3,427,795 | 2/1969 | Howard et al. | 423/421 |
| 4,248,601 | 2/1981 | McGoush et al. | 71/64.04 |
| 4,541,832 | 9/1985 | Vitellaro et al. | 23/303 |

OTHER PUBLICATIONS

J. T. Baker Chemical Co, Specifications Catalog & Price List #620, 1961 Phillipsburg, N.J. pp. 176–177, 204–207.

Skoog et al Fundamentals of Analytical Chemistry Holt Rinehart & Winston New York, N.Y. 1963 pp. 173–174, 185–186.

Primary Examiner—Gary P. Straub
Attorney, Agent, or Firm—Joseph H. Roediger

[57] ABSTRACT

A method of reducing soluble and insoluble impurity levels while increasing the size of water soluble salt crystals which includes an initial step of fine grinding followed by regrowth in a saturated solution of the salt subjected to agitation.

6 Claims, No Drawings

METHOD OF REFORMING SOLUBLE SALTS TO EFFECT PURIFICATION AND INCREASE CRYSTAL SIZE THEREOF

This application is a continuation of copending application Ser. No. 309,316, filed Feb. 10, 1989 abandoned which is a continuation of application Ser. No. 106,174, abandoned filed Oct. 7, 1987.

BACKGROUND OF THE INVENTION

The present invention relates to the purification of salt crystals and, more particularly, the removal of insoluble impurities as well as soluble impurities from salts such as potassium chloride, sodium chloride, sodium sulfate and sodium carbonate.

In practice, potassium chloride, sodium chloride and the like are produced by mining operations which produce a raw salt product containing a variety of impurities thereby requiring further processing before use. As the chemical raw material used in the production of a variety of other chemicals, these salts must meet certain purity specifications depending upon the specific chemical process with which they are to be utilized. Of particular importance in providing a satisfactory salt product to the user are the calcium and magnesium compounds. These soluble impurities appear usually in the form of sulfates and chlorides and are known to have an adverse effect on a host of different industrial processes.

The purification of sodium chloride salt can be accomplished by dissolving the mined salt together with its soluble impurities to form a brine, separating the brine from these insoluble impurities liberated as a result of dissolving the salt, and recovering the salt by crystallization processes. These steps result in an increased purity of the crystallized product commensurate with the purity of the brine, it being understood that continued removal of the desired salt by crystallization increases the concentration of soluble impurities in the brine until some of these become insoluble, and which then become incorporated, encapsulated or occluded within the resultant salt crystals along with portions of the impure brine.

The purification of other salts has been primarily directed to the removal of impurities accomplished by a number of different leaching processes in which the ore is contacted with a leaching solution which becomes enriched with the product being recovered and then subjected to further processing such as crystallization. Other attempts to purify salt have considered selective precipitation wherein a chemical is added to a salt solution or brine to precipitate only the particular material of interest. In these processes, both soluble and insoluble impurities present in the pregnant solution are incorporated, encapsulated or occluded within the resultant salt crystals.

In addition to mining the salts, solar evaporation of brine from the ocean and from inland lakes as well as the evaporation of brines by open pan or vacuum pan processes are utilized to prepare crystallized salts. The soluble calcium, magnesium and sulfate impurities are present in the source material and normally appear in unacceptably high quantities in the crystallized product thereby requiring further processing to produce a sufficiently pure salt for many industrial purposes. The brine, usually high in organics and carrying bacteria unwanted in food, is often entrapped in solar salt crystals.

One method of treating solar salt to enhance purification is described in U.S. Pat. No. 3,360,343 wherein the crude salt is reduced to a particle size of approximately 400 microns (40 mesh) and contacted with a dilute acid such as hydrochloric or nitric acids. The resultant slurry is agitated, filtered, washed and dried prior to use. Another process utilized in purifying crystaline salts is described in U.S. Pat. No. 4,385,902 wherein a potassium chloride is contacted with an aqueous liquid leaching solution that is saturated with respect to potassium chloride. The solution is percolated through relatively large salt particles, e.g. 28 mesh, with care being taken not to agitate so that the particles are not subdivided into fines. The leaching process has been shown to be effective in reducing soluble impurities in potassium chloride.

A mechanical approach to reducing the impurity level in sodium chloride is described in U.S. Pat. No. 4,094,956 wherein a mechanical process of attrition washing is stated to be effective in removing sulfates from the salt. The method requires a crushing of the salt to expose a major proportion of the sulfates present on the surface of the crystal structure. The reference points out that the coarse crushing of the start material should not break the individual sodium chloride monocrystals. The wash is carried out by strongly agitating the crushed material in a sodium chloride brine having a limited amount of dissolved sulfates therein. The agitation provides interaction between particles to abrade away the surface impurities, causing them to enter into solution, and thereby reduce the level of this undesired constituent.

These known processes for reducing soluble impurity levels in salts, such as sodium and potassium chlorides, are noted for not addressing the problem of insoluble impurities contained within the salt. These processes, designed to operate with relatively large size particles of salt, teach the importance of maintaining particle size during the process so as not to reduce their effectiveness in reducing the soluble impurity level of the treated salt. The effect of these processes on insoluble impurities is limited to surface impurities. As a result, impurities within the salt crystal remain essentially undisturbed. Fine salt particles are either segregated prior to treatment or not beneficiated as a result of these processes.

Accordingly, it is the primary objective of the present invention to provide a method for the purification of salt characterized by the removal of both insoluble and soluble impurities as well as organic materials and entrapped brine. In addition, the present invention is directed to the treatment of small particle size salt to remove both soluble and insoluble impurities therefrom while increasing the crystal size of the purified product so as to exceed that of the start material. Furthermore, the present process is concerned with achieving these goals without the use of acid treating solutions or the substantial energy requirements characteristic of conventional vacuum pan processing thereby providing improved operating costs.

SUMMARY OF THE INVENTION

The present invention is directed to a method for the purification and reformation of salt crystals. In addition, the invention is particularly concerned with the removal of insoluble impurities found in mined salt such as clay or shales, as well as the soluble impurities found in different salts.

In the practice of the present invention, the salt crystals are initially reduced in size to a finely-ground crystal mass. In the fine-grinding of the crystals, the higher energy crystals, which are those crystals containing impurities that alter the lattic structure of the crystal, are more readily fractured. These impurities form points of weakness or strain therein which are felt to promote fracture proximate thereto. As a result, the impurity sites are apparently exposed during the fine-grinding. The lower energy crystals or portions of crystals, created by subdivision through the fine-grinding step have the fewest points of weakness or strain typically represent the larger size fraction after the fine-grinding step. In practice, the feed material for this process can be the tailings from an active potash mining or salt mining operation. The finely-ground crystal mass is then added to a substantially saturated solution of the salt which will, with agitation, form a suspension of crystals in the solution.

When the finely-ground mass is mixed with the solution, the soluble impurities exposed or released during the preparation of the finely-ground material are found to go into solution and are disseminated in the mixture of fine crystals and saturated brine. The salt crystals most soluble due to high surface and/or strain energy then go into solution. While the solution may be initially saturated at the time the finely-ground crystal mass is added, the solubility of the small crystals is believed to be enhanced by their size and conditioning in the fine-grinding so that they can readily enter into solution causing localized supersaturation. The process utilizes the preferential dissolution of the high energy crystals containing higher levels of impurities. The relatively pure crystals are more stable and serve as nuclei for the atoms to then reform thereon as new growth of increased purity. The suspension is preferably agitated modestly to reduce the possibility of mechanical entrapment of brine, organics, or of the insoluble impurities in the salt crystals as they are reforming in suspension and to increase the rate at which reforming occurs.

The process time may be reduced by raising the temperature of the suspension which has been found to effect the rate of reformed growth of the finely-ground salt crystals. The growth rate of the salt crystals greatly exceeds that of the insoluble impurities, if in fact they are capable of supporting crystal growth, producing an ever increasing disparity in size. The composition of the crystal growth occurring is determined by the composition of the solution, which composition is regulated according to the purity required in the final product. The composition of the reformed salt crystals, as they increase in size, is found to be substantially purer than the initial feed material.

The time of maintenance of the crystal mass in contact with the brine, the ratio of brine to crystal mass, the amount of agitation, and the temperature of the solution determine, in part, the rate of growth experienced by the crystals and are to be modified in accordance with the desired product. It has been demonstrated repeatedly that the resultant crystals are grown to sizes substantially larger than found in the initial finely-ground crystal mass. Thus, growth is continued to permit the reformed salt crystals to be readily separated from the insoluble impurities using screening or other methods common in separating different sizes of materials. A major portion of the soluble impurities found in the feedstock remain in solution, and therefore are not present in the reformed salt crystals. Thus, the present invention provides a method for reforming and purifying salt crystals without requiring the addition of acidic leachants or utilizing self-abrading techniques on large salt particles, or the high energy consumption of the open pan or vacuum pan evaporators. This process can be utilized to treat the entire mine output or the fine particle fraction frequently segregated and stored because of lack of commercial value.

Further features and advantages of the invention will become more readily apparent from the following detailed description of a preferred embodiment of the invention.

DESCRIPTION OF A PREFERRED EMBODIMENT

The present invention is concerned with the purification of soluble salt crystals and, in particular, to the treatment of potassium chloride and sodium chloride concentrated and crystallized from inland or ocean brines or produced from mining operations. The impurities associated with the recovery of these salts are primarily compounds of calcium and magnesium along with sulfate ions in sodium chloride, and sodium chloride in potassium salts, though many others may be present depending on the source of the salt. Typically, these elements are present as chlorides, sulfates and carbonates. In addition, non-salt solids may also be present such as clay, sand or shale. In order to be effective in industrial processes, both insoluble and soluble impurities must be substantially eliminated.

The initial step in the practice of the present invention is the provision of a process feed material comprised of salt crystals and associated impurities in the form of a finely-ground crystal mass. The particular equipment used in conducting a fine grind is not particularly important. However, distinct advantages accrue from the use of wet grinding to provide a crystal mass in which a major fraction of the resultant material passes through a 200 mesh screen. The agitation of the wet grinding process provides a suspension of the crystals in the brine which enables crystal reforming to be initiated and impurity segregation to take place. As will later be explained, dry fine grinding can be used as the initial step if desired.

The fine grinding of the crystals, which increases the surface area and the amount of lattice distortion of the crystal mass, is believed to so increase the energy of these crystals that their solubility is greater than before grinding. Because the presence of impurities also increases lattice irregularities, crystals having a larger amount of these impurities also have a higher energy than average and are believed to be more readily soluble than the purer, lower energy crystals which serve as nuclei for the reformation process. The process has been found to be especially effective with feed material that has been prepared so as to pass through a 325 mesh screen. It should be noted that a by-product of many salt mining and potash mining facilities is a collection of fines which carry little value in the marketplace. The process is economically attractive in dealing with these otherwise undesirable tailings or undersized products.

The design and operation of hammer mills and ball mills sufficient to provide the necessary fine grinding utilized in the present invention is well within the state of the art. The tests performed to demonstrate the efficacy of the present invention utilized hammer mills, a jar mill with different size ceramic rondelles, and a tower mill using metal grinding balls operating at 80 pounds per hour to provide a process feed wherein approximately 90 percent passes through a 200 mesh screen, or as required. The fine grinding results in the liberation of the insoluble impurities which, after grinding, are found to be primarily minus 200 mesh. This liberation of entrapped insoluble impurities was confirmed by analysis of samples taken from the finely-ground crystal mass which showed the separation of the discrete particles.

The fine-grinding provides a crystal mass which is added to a substantially saturated contained solution of the salt being reformed. The solution, if not completely saturated at the time of addition of the crystal mass, quickly reaches saturation. To promote purification, the brine is prepared essentially free of impurities and the composition thereof can be monitored during the process to determine if the impurity level increases to an undesired level. Since insoluble impurities are largely liberated from the salt crystals by the fine-grinding and by dissolution of the higher energy particles, they disperse throughout. The soluble impurities that have been liberated due to dissolution of the high energy crystals enter into solution. Those soluble impurities which remained entrapped after fine-grinding are believed to be liberated when the ions of the high energy crystal seek the lower energy state of a regularly ordered crystal resulting in a great reduction in the number and volume of the smaller crystals. By using wet grinding in the presence of the saturated brine, the process is taking place during the preparation of the crystal mass.

Next, the suspension is subjected to agitation to further promote the segregation of insoluble impurities in the suspension. In applications of the process wherein the level of insoluble impurities is known to be high, the agitation can be repeated or continuous to reduce the likelihood of the once liberated insolubles becoming again entrapped since a regrowth and reforming of salt crystals is taking place during the process. The amount of agitation is to be empirically determined for a particular feed material. It is to be noted that wet grinding to the fine state includes agitation while the process is taking place. When the ground material constituting the partially reformed material is added to brine, the agitation thereof is preferred. In a series of tests of the present process on solar salt, movement of the container by the test personnel was found sufficient to produce the desired result, but continuous agitation worked better when insoluble material was higher as in mind salt and potash tailings. For large scale operation, intermittently or continuously operated paddles or impellers in the reforming containers can be employed as necessary or external pumps may be used for recirculation.

Since the entrapped insolubles have been for the most part liberated and distributed, the growth of the salt crystal does not incorporate any significant amount of this type of impurity. In the case of an impurity such as calcium sulfate, the solubility in brine decreases with increasing temperature so that when elevated temperatures are used to increase the rate of reforming, the effects of the present process are enhanced. The insoluble impurities do not appreciably increase in size during the reforming of the salt crystal in the purified state. As a result, mechanical separation based on size is readily utilized at the termination of the process to remove the finely-ground insoluble impurities.

The increase in temperature of the suspension directly influences the rate of growth of the reformed salt crystals. While the use of fuel-generated heat is very controllable, the process has been repeatedly and successfully tested using only ambient temperatures. Solar energy can be used to hasten reforming as will be noted from the following examples wherein the increases in purity of the reformed crystals are demonstrated by a wet screening to separate the different fractions after reforming.

While the process can be utilized with a number of salts, for example sodium chloride, potassium chloride, sodium carbonate, sodium sulfate and the like, the following discussion refers to tests performed with sodium chloride feed material and a sodium chloride brine solution to which the finely-ground crystal mass is added.

The tests were conducted after fine-grinding raw ocean salt recovered from conventional solar evaporation techniques so that 90 percent of the material passed through a 200 mesh screen. The initial material was tested for calcium (385 ppm), magnesium (58 ppm) and water insoluble impurities (540 ppm). The finely-ground crystal mass was added to a saturated sodium chloride brine and the sealed containers exposed to the desert sun for two summer months. The containers were each shaken at the end of the first month. The results of testing four samples showed the size analysis and impurity levels at the end of the two month period to be as set forth below.

| Screen Size | Retained Size Analysis | Calcium (ppm) | Magnesium (ppm) | Water Insolubles (ppm) |
|---|---|---|---|---|
| SAMPLE #1 | | | | |
| 100 | 33.2% | 3.0 | 4.0 | 32.2 |
| 140 | 31.4% | 5.0 | .9 | 51.8 |
| 200 | 28.9% | 4.6 | 2.3 | 5.5 |
|  | 93.5% | | | |
| −200 & losses | 6.5% | | | |
| SAMPLE #2 | | | | |
| 100 | 42.8% | 1.7 | 1.3 | 55.2 |
| 140 | 28.6% | 1.1 | 1.7 | 20.3 |
| 200 | 24.5% | 2.0 | 2.2 | 4.9 |
|  | 95.9% | | | |
| −200 & losses | 4.1% | | | |
| SAMPLE #3 | | | | |
| 100 | 36.4% | 1.5 | 0.4 | 14.2 |
| 140 | 36.7% | 1.5 | 1.1 | 25 |
| 200 | 19.5% | .8 | 1.0 | 3.3 |
|  | 92.6 | | | |
| −200 & losses | 7.4% | | | |
| SAMPLE #4 | | | | |
| 100 | 28.6% | 1.1 | 0.3 | 11.2 |
| 140 | 47.3% | 1.9 | 1.4 | 51.1 |
| 200 | 18.6% | 1.5 | 0.9 | 6.9 |
|  | 94.5% | | | |
| −200 & losses | 5.5% | | | |

The test results above clearly demonstrate the reformation of the sodium chloride crystals to a larger crystal size with greatly reduced impurity levels. In all four tests, the 90 percent −200 mesh size has become 90 percent +200 mesh with about 70 percent of the material being larger than +140 mesh. The purity of the reformed crystals has been enhanced by at least an order of magnitude.

The foregoing tests performed over a relatively long period of time, e.g., two months, utilizing the desert summer sun to supply heat energy, were conducted to demonstrate the efficacy of the present invention for low energy cost operation. Since the favorable conditions available in the southwestern United States are not present to the same degree elsewhere, the direct application of heat to the contained suspension is tested. The following tests performed with mined sodium chloride feed material show the marked decrease in time to effect the desired result when the suspension is subjected to direct heating. The analysis of the feed material is shown below.

| Screen Size | % | Calcium (ppm) | Magnesium (ppm) | Sulfate (ppm) | Water Insolubles (ppm) | Acid Insolubles (ppm) |
|---|---|---|---|---|---|---|
| +40 | 79.3 | 761.3 | 103.1 | 1744.6 | 13718.9 | 13243.1 |
| +70 | 10.0 | 130.0 | 20.0 | 340.0 | 2110.0 | 2030.0 |
| +140 | 5.4 | 113.4 | 16.2 | 334.8 | 2170.8 | 2111.4 |
| +325 | 3.9 | 152.1 | 21.5 | 343.0 | 1548.3 | 1462.5 |
|  | 98.6 |  |  |  |  |  |

The first test performed with this material began with the step for dry fine-grinding to −400 mesh with the ground crystal mass added to a saturated sodium chloride brine in a batch reactor. The reactor was continuously rotated, and the reactor baking period was 125 minutes, the time required for the container to reach 500° F. After removal from the reactor, the container and suspension therein were quenched in tap water and the reformed crystals removed by screening the slurry and analyzed with the following results.

TEST #1

| Screen Size | % | Calcium ppm | Magnesium (ppm) | Sulfate (ppm) | Water Insolubles (ppm) | Acid Insolubles (ppm) |
|---|---|---|---|---|---|---|
| +40 | 5.7 | 8.6 | 0.2 | 13.1 | 28.5 | 22.8 |
| +70 | 19.1 | 26.7 | 0.4 | 34.4 | 51.6 | 43.9 |
| +140 | 58.8 | 76.4 | 1.2 | 105.8 | 211.7 | 182.3 |
| +325 | 14.5 | 42.1 | 0.3 | 81.2 | 132.0 | 104.4 |
|  | 98.1 |  |  |  |  |  |

In tests #2 and #3, the crystal mass and suspension were prepared in the manner used in Test #1 with the only differences being the final reactor temperatures, 400° F. and 450° F., respectively, and the suspension heating intervals, 95 minutes and 240 minutes, respectively.

TEST #2
400° F. for 95 Minutes)

| Screen Size | % | Calcium (ppm) | Magnesium (ppm) | Water Insolubles (ppm) | Acid Insolubles (ppm) |
|---|---|---|---|---|---|
| +40 | 38.1 | 5.0 | 0.4 | 55.6 | 43.4 |
| +70 | 19.6 | 3.1 | 0.2 | 33.5 | 23.5 |
| +140 | 20.8 | 2.9 | 0.2 | 32.0 | 25.0 |
| +325 | 18.9 | 3.4 | 0.4 | 90.7 | 79.6 |
|  | 97.4 |  |  |  |  |

TEST #3

| Screen Size | % | Calcium ppm | Magnesium (ppm) | Sulfate (ppm) | Water Insolubles (ppm) | Acid Insolubles (ppm) |
|---|---|---|---|---|---|---|
| +40 | 3.7 | 6.3 | 0 | 8.9 | 1.5 | 1.5 |
| +70 | 55.4 | 77.6 | 0.6 | 127.4 | 33.2 | 27.7 |
| +140 | 32.8 | 59.0 | 0.3 | 95.1 | 49.2 | 45.9 |
| +325 | 6.5 | 29.3 | 0.3 | 57.9 | 44.2 | 42.3 |
|  | 98.4 |  |  |  |  |  |

The above-noted results clearly demonstrate the efficacy of the process for the purification of sodium chloride wherein the impurity levels in the reformed crystals were reduced by at least an order of magnitude for soluble impurities. The unweighted results were found to show a reduction in both water-soluble and acid-soluble impurities of two orders of magnitude.

A series of tests were successfully conducted using finely-ground crystal masses of different salts such as sodium sulfate and sodium carbonate. These tests demonstrated the reforming process to produce larger crystals of enhanced purity consistent with the previously-noted sodium chloride tests. In the case of sodium carbonate, a −325 mesh crystal mass added to a sodium carbonate brine with heat applied for less than one hour showed 75 percent of the crystals to be +170 mesh with insoluble impurity levels being reduced to 25 percent level of the −325 mesh start material. Similar testing of sodium sulfate finely ground to −325 mesh and heated for 20 minutes at 220° F. showed 30 percent of the crystals to have grown to +325 mesh with water insoluble impurity levels of about 10 percent of the level of the initial material.

The preparation of the impure salt for the practice of the present invention can be accomplished by either wet or dry grinding. The use of wet grinding techniques sustained for a period results in the performance of the inventive method since the initial fine-grinding in brine quickly results in the saturation thereof and the liberation of impurities. The insolubles act as previously described in that they do not experience a regrowth. The low-energy salt crystals do experience the aforedescribed regrowth while the high-energy impure salt crystals apparently enter the brine solution with the continual purification of the crystal mass taking place. The grinding rate can be decreased and the degree of grind modified so as to permit the reformed salt crystals to achieve a regrown size that is sufficient to permit a mechanical separation of the finely-ground insoluble impurities. The process is one of continual agitation with energy being added to the grinding process. As the rate and size are modified, the temperature can be elevated to hasten the reforming of the nuclei to grow the purified salt crystals.

The wet-ground crystal mass having undergone reforming in the initial stage is preferably added to a brine solution for the completion of the process. However, removal of a portion of the finely-ground mass by mechanical size separation provides a purified product while decreasing the volume of material to be added to the brine thus enhancing the production capability of a production facility.

One test performed with one ton of Louisiana-origin water softener grade bagged salt was conducted after being subjected to wet grinding and then stored in brine to provide a food-grade salt. Initially the salt was finely-ground so that 90% was −200 mesh using a roll crusher followed by a vertical ball mill. The crystal mass was decanted into black containers and filled and covered with 2 to 4 inches of the brine recovered from grinding. The containers were sealed and stored outside in the desert environment.

The start material had 1.33% of insoluble materials which were large enough to be noticed in the consumer's mouth as well as damaging to food processing equipment. After 42 days it was noted from samples that the material was 90% plus 200 mesh and the level of the insolubles in the recovered crystals was only 5% of the initial impurity level.

The tests continued until the material was reformed to the point where 30% of the crystals were plus 30 mesh. Calculations show the 200 mesh crystal to have increased in size by a factor of 505. Thus, 504 salt crystals initially ground to 200 mesh dissolve and reform on a single nuclei without requiring either purchased energy or evaporation apparatus. Further, the present reforming process permits the final liberation of entrapped or attached impurities, both soluble and insoluble.

At different intervals, recovered crystals were segregated as to size and tested for impurity levels. As crystal size increased, the level of insoluble impurities was observed to begin to increase in those containers which experienced no agitation. Thus, modest agitation reduces the tendency of the reformed crystals to incorporated insolubles during reforming.

The same tests were performed with water softener grade salt from the Great Salt Lake in Utah with similar results. Both tests showed continued growth of crystals with time and a continuing increase in purity, provided at least a modest agitation in some form takes place.

While the above description has referred to particular tests utilized in the practice of the process, it is to be noted that modifications and variations may be made therein without departing from the scope of the invention as claimed.

I claim:

1. A method for the purification and reformation of crystals of a soluble salt selected from the group consisting of NaCl and KCl to reduce the soluble and insoluble impurity content thereof which comprises the following steps:
   a) fine grinding said soluble salt crystals to form a finely ground crystal mass having 90 weight percent of salt crystals therein at least as fine as 200 mesh, soluble and insoluble impurities being liberated from the salt crystals during the fine grinding;
   b) contacting the crystal mass with an agueous solution of said soluble salt to form a two phase suspension of the salt crystals in a saturated solution and to promote crystal growth by reformation of the crystals from dissolved salt atoms, said contact being maintained for an interval sufficient to provide reformed salt crystals of increased size, said reformed crystals undergoing purification during continued contact with the solution; and
   c) removing the reformed salt crystals from the solution, said crystals being characterized by reduced levels of soluble and insoluble impurities.

2. The method in accordance with claim 1 further comprising the step of increasing the temperature of said suspension to promote crystal growth of the finely-ground crystals therein.

3. The method in accordance with claim 2 further comprising the step of agitating the suspension.

4. The method in accordance with claim 2 further comprising the steps of maintaining the crystal mass in said suspension after increasing the temperature thereof, and screening the solution to effect separation of the reformed salt crystals from the insoluble impurities.

5. The method in accordance with claim 1 wherein the step of fine-grinding reduces the crystal size to approximately 325 mesh.

6. The method in accordance with claim 1 wherein the finely-ground crystal mass is wet-ground in a saturated solution of the salt being reformed.

* * * * *

UNITED STATES PATENT AND TRADEMARK OFFICE
CERTIFICATE OF CORRECTION

PATENT NO. : 5,300,123
DATED : April 5, 1994
INVENTOR(S) : Gerald J. Grott

It is certified that error appears in the above-identified patent and that said Letters Patent is hereby corrected as shown below:

Cover Page under Related U.S. Application Data, item [63]:

Should read:

Continuation of Ser. No. 309,316, Feb. 10, 1989, abandoned, which is a continuation of Ser. No. 106,174, Oct. 7, 1987, abandoned.

Signed and Sealed this

Sixteenth Day of August, 1994

Attest:

BRUCE LEHMAN

Attesting Officer

Commissioner of Patents and Trademarks